(12) United States Patent
Hisashi et al.

(10) Patent No.: US 6,372,349 B1
(45) Date of Patent: Apr. 16, 2002

(54) HIGH-RESISTIVITY CARBON BLACK

(75) Inventors: Hideyuki Hisashi; Satoru Arata, both of Himeji; Yuuichi Sekine, Yokkaichi, all of (JP)

(73) Assignees: Mitsubishi Chemical Corporation; Mikuni Color Ltd., both of (JP)

( * ) Notice: Subject to any disclaimer, the term of this patent is extended or adjusted under 35 U.S.C. 154(b) by 0 days.

(21) Appl. No.: 09/644,727

(22) Filed: Aug. 23, 2000

(30) Foreign Application Priority Data

Aug. 27, 1999 (JP) .......................... 11-241943
Oct. 6, 1999 (JP) .......................... 11-285075

(51) Int. Cl.$^7$ ................................. B32B 5/16
(52) U.S. Cl. ................ 428/407; 523/215; 523/468
(58) Field of Search ................ 523/468, 215; 423/460; 428/407

(56) References Cited

U.S. PATENT DOCUMENTS 5,908,720 A  6/1999  Uchikawa et al. ............. 430/6

FOREIGN PATENT DOCUMENTS

| JP | 9-26571 | 1/1997 |
|----|---------|--------|
| JP | 9-71733 | 3/1997 |
| JP | 9-95625 | 4/1997 |
| JP | 9-124969 | 5/1997 |
| JP | 9-166869 | 6/1997 |
| JP | 9-304760 | 11/1997 |
| JP | 10-60169 | 3/1998 |
| JP | 10-330643 | 12/1998 |
| JP | 11-60988 | 3/1999 |
| JP | 11-60989 | 3/1999 |
| JP | 11-80583 | 3/1999 |
| JP | 11-80584 | 3/1999 |
| JP | 11-181324 | 7/1999 |
| JP | 11-181326 | 7/1999 |

*Primary Examiner*—Robert Dawson
*Assistant Examiner*—D. Aylward
(74) *Attorney, Agent, or Firm*—David G. Conlin; Christine C. O'Day; Edwards & Angell, LLP

(57) ABSTRACT

The present invention relates to a high-resistivity carbon black coated with a resin on the surface and having a volume resistivity of not less than 100 Ω·cm.

24 Claims, No Drawings

HIGH-RESISTIVITY CARBON BLACK

BACKGROUND OF THE INVENTION

The present invention relates to a high-resistivity carbon black and a color filter using it. The high-resistivity carbon black according to the present invention is suited for use as carbon black for insulating black matrices and spacers of optical color filters used in color TV, liquid crystal color TV, cameras, etc.

In the liquid crystal displays, a liquid crystal material is filled in the spaces of about 1 to 10 μm formed in a transparent substrate such as glass substrate provided with the transparent electrodes, and the liquid crystal is oriented in a fixed direction by a voltage applied across the electrodes to form a transparent portion and an opaque portion to thereby display an image. In the color liquid crystal displays, the color filters for the three colors, viz. red (R), green (G) and blue (B) corresponding to the three primary colors of light are provided on a transparent substrate, and light transmission through the liquid crystal is controlled by adjusting the voltage applied to the transparent electrodes, whereby to control the amount of light passing through the R, G and B three color filters to make color display by color development caused by the addition of the three primary colors.

Various methods are available for forming the R, G and B color layers. For instance, a method can be used in which such layers are formed on a substrate provided with the black matrix films partitioning the respective colors, or the black matrix films are provided after forming the three colors of R, G and B. In either case, the role of the black matrix is to demarcate the three primary colors R, G and B from each other and to screen the light from the liquid crystal driving electrodes or TFT (thin-film transistors) provided on the substrate in opposition to the color filters.

As an example of black matrices of color filters used for the above purpose, there is known the type in which the resist film having carbon black dispersed therein as black coloring material is patterned. Carbon black is essentially a conductive material, so that the resist film having such a material dispersed therein necessarily exhibits conductivity or semiconductivity. So, development of a carbon black having increased resistivity (insulating performance) while maintaining its light screening activity has been strongly desired.

The present applicant have made various studies on carbon black coated with a resin, such as polyfunctional epoxy resin, to be used as high-resistivity carbon black for black matrices of color filters, and on the method of producing such carbon black (Japanese Patent Application Laid-Open (KOKAI) Nos. 9-26571, 9-71733, 9-95625, 9-124969, 9-304760, 10-60169, 10-330643, 10-60988, 10-60989, 11-80583, 11-80854, etc.), and also proposed a high-resistivity carbon black which has been subjected to a specific oxidation treatment on the surface (Japanese Patent Application Laid-Open (KOKAI) Nos. 11-181324, 11-181326, etc.). However, by using the above-mentioned conventional techniques, volume resistivity of any obtained carbon black has been limited to the order of 5 to 50 Ω·cm at the highest.

SUMMARY OF THE INVENTION

An object of the present invention is to provide a high-resistivity carbon black having a high light screening performance and a low surface reflectance and also capable of providing a thin-film black matrix.

Another object of the present invention is to provide a color filter using the said carbon black for the black matrix.

To attain the above aim, in the first aspect of the present invention, there is provided a high-resistivity carbon black coated with a resin on the surface and having a volume resistivity of not less than 100 Ω·cm.

In the second aspect of the present invention, there is provided a process for producing the high-resistivity carbon black as defined in the first aspect, which comprises adding and mixing a resin-containing solution in a carbon black dispersion to coat the carbon black particle surfaces with the resin, and then curing the resin to obtain resin-coated carbon black having a volume resistivity of not less than 100 Ω·cm.

In the third aspect of the present invention, there is provided a carbon black dispersion for black matrix forming resist, comprising (a) a high-resistivity carbon black coated with a resin on the surface and having a volume resistivity of not less than 100 Ω·cm, (b) a dispersant having an electron donative group, and (c) a dispersing medium.

In the fourth aspect of the present invention, there is provided a color filter having a black matrix obtained by patterning a resist film having a black coloring material dispersed therein, wherein a high-resistivity carbon black coated with a resin on the surface and having a volume resistivity of not less than 100 Ω·cm is used as the black coloring material.

The said high-performance carbon black can be used advantageously as a black coloring material for color filters.

DETAILED DESCRIPTION OF THE INVENTION

The high-resistivity carbon black according to the present invention is coated with a resin on the surface. The starting carbon black used in the present invention is not specifically defined, but it is preferable to use the type in which the value obtained from dividing volatile content by specific surface area (amount of volatiles based on unit specific surface area) is not less than $0.01\%·g/m^2$, preferably not less than $0.02\%·g/m^2$, more preferably not less than $0.03\%·g/m^2$. Specific reference to the above attribute (concerning the amount of volatiles based on unit specific surface area) of the present carbon black is for the reason that the more the specific surface area of carbon black, the more amount of volatiles adhere on the (carbon black particle) surfaces, but the volume resistivity mentioned later does not represent the absolute amount of volatiles but is interrelated with the amount of volatiles adhering on the unit surface area.

The volatile content of carbon black can be increased by an oxidation treatment of carbon black with ozone and/or hydrogen peroxide. Generally, as the oxidizing agent of carbon black, there are used, beside those mentioned above, nitric acid, NO gas, $NO_2$ gas, air, $SO_3$ gas, fluorine gas and the like, but the improvement of volume resistivity with a relatively small amount of volatiles based on unit specific surface area is achieved especially when ozone and/or hydrogen peroxide are used as the essential oxidizing agent in combination with the said other oxidizing agents such as nitric acid and $NO_2$ gas.

Volatile content was determined by a method in which carbon black is heated at 950° C. for 7 minutes and percent loss in weight is calculated according to JIS K 6221. Specific surface area can be determined by the nitrogen adsorption method using the BET formula. That is, nitrogen adsorption of carbon black is measured by the low-temperature nitrogen adsorption method using a low-temperature nitrogen adsorbing device (Sorptomatic, 1800 mfd. by, Carlo Elba Co., Ltd.

Italy), and based on the thus measured nitrogen adsorption, the specific surface area is calculated by the multiple point method using the BET formula.

The starting carbon black used in the present invention is preferably the one which has an ash content of not more than 1.0% by weight, especially not more than 0.5% by weight. Main components of ash are alkaline metals or alkaline earth metals such as Na, K, Ca, etc., and carbon black with high contents of these ash components has difficulties in improving its volume resistivity. Reduction of such ionic conductive materials can be achieved by proper selection of stock oil, gas and additives used in the production of carbon black. It can also be attained by washing with water or pickling of carbon black just out of the kiln. Ash content can be calculated from the amount of ash that remains after 5- to 6-hour combustion of carbon black in the air at 750° C.

It is also preferable that the dispersed particle diameter of carbon black in the dispersion is as small as possible. If the dispersed particle diameter is large, it is hard to obtain desired insulating performance or dispersibility when forming the resist. The dispersed particle diameter is usually not more than 20 microns, preferably not more than 5 microns. Water or an aqueous ethanol solution is preferred as the dispersing medium used in the preparation of carbon black dispersion. Dispersing operation can be properly conducted by a known dispersing device using various types of surfactant and/or dispersing agent. The surfactant and dispersing agent used in the present invention are preferably those containing no alkaline metal or alkaline earth metal. Volatile hydrophilic solvents (such as ethanol) are preferably used as dispersing agent.

The resin used for coating carbon black is not specified, but epoxy resins, especially polyfunctional epoxy resins are preferably used. Examples of such polyfunctional epoxy resins include glycylamine-based epoxy resins, triphenylglycidimethane-based epoxy resins, tetraphenylglycidimethane-based epoxy resins, aminophenolic epoxy resins, diamidodiphenylmethane-based epoxy resins, phenolic novolak epoxy resins, orthocresol epoxy resins, and bisphenol A novolak epoxy resins.

In case of using an epoxy resin, it is possible to use a curing agent and/or curing accelerator as means for controlling volume resistivity and surface properties of the resin-coated carbon black. Use of these agents can afford excellent properties such as insulating properties and heat resistance to the coated resin.

The curing agent used in the present invention is not specified, but acid anhydrides, imidazole compounds or BF3 complexes are preferably used for providing peculiarity to the insulation properties of the resin. In view of efficiency in the reaction step, it is most preferable to use an imidazole compound which allows curing at a relatively low temperature in a short time.

Typical examples of the imidazole compounds usable for the above purpose include 2-methylimidazole, 2-ethyl-4-methylimidazole, 2-undecylimidazole, 2-heptadecylimidazole, 2-phenylimidazole, 1-benzyl-2-methylimidazole, 1-cyanoethyl-2-methylimidazole, and 2,4-diamino-6-[2-methylimidazolyl-(1)]-ethyl-S-triazine. The amount of the curing agent to be used is usually 1 to 30% by weight, preferably 5 to 25% by weight, more preferably 10 to 20% by weight, based on the total amount of the resin and curing agent. The type and amount of the curing accelerator may be properly decided in the usual way according to the type of the curing agent used.

Resin coating of carbon black is preferably performed by supplying a resin emulsion to a carbon black dispersion. A resin solution may be used in place of the resin emulsion.

A surfactant and an alcohol can be used for the preparation of the said resin emulsion. Any surfactant can be used as far as it is capable of forming a resin emulsion, but a nonionic or ampholytic surfactant free of metals is preferably used. A surfactant with HLB of 8 to 18 suited for the preparation of O/W emulsions is also preferred. The particle diameter of the resin emulsion is preferably not more than 10 microns, more preferably not more than 5 microns. Use of the said resin emulsion contributes to stabilizing homogeneity of the resin to be coated on the carbon black agglomerates to uniformalize the surface coating condition.

After a resin emulsion has been added to the carbon black dispersion, the dispersion is subjected to a heat treatment to cure the resin in the dispersion. The conditions of the heat treatment differ depending on desired volume resistivity of the resin-coated carbon black, type of the resin, use or non-use of curing accelerator and other factors. For instance, in case of preparing carbon black with high resistivity of over 3,000 $\Omega \cdot cm$ by using a curing agent, usually a heat treatment of longer than 4 hours at 70° C. is required after evaporation of the solvent.

The amount of resin coating on carbon black is usually 5 to 40% by weight, preferably 7 to 20% by weight, based on the total amount of carbon black and resin. When the amount of coating is less than 5% by weight, there may not be obtained any better dispersibility, dispersion stability and volume resistivity in comparison with the non-treated carbon black. On the other hand, when the amount of coating exceeds 40% by weight, there exists an excess amount of resin that acts to fuse together the agglomerates, which may result in deteriorating dispersibility.

Volume resistivity of the resin-coated carbon black (powder) is determined in the following way. About 2 g of sample is placed in a 2 cm $\phi$ Teflon-made container having a brass-made electrode at the bottom, and after covering the container with a Teflon-made bar having a brass electrode at an end, load is applied by Tensilon at a rate of 0.2 mm/min and resistance at the point of loading of 50 kg/cm$^2$ is measured by a high-sensitivity tester. Volume resistivity is calculated from height (cm) of the carbon black powder and resistivity of the powder under this load, according to the following equation:

$$\text{Volume resistivity } (\Omega \cdot cm) = (\text{sectional area } (cm^2) \text{ of carbon black powder} \times \text{resistivity } (\Omega))/(\text{height } (cm) \text{ of carbon black powder})$$

It is also preferable that the resin-coated carbon black has a pH of not less than 5, preferably not less than 7, as measured in the state of a water slurry. The upper limit of pH is usually 10. The pH values shown here are those obtained with a water slurry prepared by adding 10 g of the resin-coated carbon black in 100 ml of water and stirring sufficiently for 5 minutes.

The high-resistivity carbon black of the present invention described above is suited for use as a black coloring material for color filters having a black matrix obtained by patterning a resist film in which the black coloring material has been dispersed. Volume resistivity of this high-resistivity carbon black is not less than 100 $\Omega \cdot cm$, preferably not less than 3,000 $\Omega \cdot cm$, most preferably in the range of 5,000 to 500,000 $\Omega \cdot cm$. This color filter having a black matrix obtained by patterning a resist film having a black coloring material dispersed therein is characterized by the use of the said carbon black as the black coloring material. Thus, the color filter of the present invention is produced by forming usually 10 to 150 $\mu$m wide stripe or mosaic color patterns at a precision of several $\mu$m with the hues of three colors R, G and B on the surface of a transparent substrate provided with the said black matrix.

The said black matrix can be formed by conducting the steps of heating and drying, image exposure, development and heat curing successively after applying a carbon black-dispersed resist (photopolymeric composition) on a transparent substrate. It is also possible to produce the black matrix by applying the photopolymeric compositions dispersed with R, G and B, respectively, on the side of the color filter where the black matrix is to be formed, and forming the pixel images of the respective colors by successively carrying out the steps of heating and drying, image exposure, development and heat curing. The opposing electrodes (transparent electrodes) for driving the color filter are formed as a thin film on the said pixel image side by ITO or other means.

The photopolymeric compositions for the said black matrix or for the respective colors contain a photopolymerization initiator which generates a radical on absorbing light with the carbon black or respective colors, and a compound (ethylenic compound) having at least one addition-polymerizable ethylenic unsaturated double bond which is induced to polymerize by the said radical. The said compositions also optionally contain a dispersant along with an organic polymer (binder resin). These compositions are used as a coating solution prepared with a suitable solvent. The said photopolymerization initiator, ethylenic compound, organic polymer and solvent are properly selected according to the purpose of use of the resist pattern. The black matrix can be formed by applying the said resist on a transparent substrate and then conducting the steps of heating and drying, image exposure, development and heat curing. As the transparent substrate, there can be used, for example, glass substrate and substrates of plastic materials such as polycarbonate and polymethyl methacrylate. As the applicator, one may use spinner, wire bar, flow coater, die coater, roll coater, spray and the like. Image exposure is accomplished by placing a negative matrix pattern mask over the photopolymerizable layer, and applying ultraviolet or visible light through the said pattern mask. As the alkaline developer, various inorganic alkaline agents such as sodium carbonate, potassium carbonate, sodium silicate, potassium silicate, sodium hydroxide and potassium hydroxide can be used.

As the carbon black dispersion for black matrix forming resist, it is especially preferred to use one which contains (a) high-resistivity carbon black coated with a resin on the surface and having a volume resistivity of not less than 100 $\Omega \cdot cm$, (b) a dispersant having an electron donative group, and (c) a dispersing medium. The dispersion may also contain an inorganic pigment such as titanium black or an organic pigment such as dioxazine violet, perillene black, etc.

The dispersant (b) having an electron donative group is explained here. The "electron donative group" referred to herein is a substituent group which has a tendency to donate electrons in the molecule when hydrogen is used as standard. Examples of such substituent group include alkyl groups such as $-NH_2$, $-OH$, $-OCH_3$, $-OCOCH_3$, $-N(CH_3)_2$, $-NHCOCH_3$ and CH3 and aryl groups such as $-C_6H_5$. The dispersants are roughly divided into oil type dispersants and aqueous dispersants, the typical examples of which are shown below.

Examples of the oil type dispersants having an electron donative group are polycarboxylic acid esters such as polyurethane and polyacrylate, unsaturated polyamide, amine salts of polycarboxylic acids (partial), ammonium salts of polycarboxylic acids, alkylamine salts of polycarboxylic acids, polysiloxane, long-chain polyaminoamidophosphate, hydroxyl group-containing polycarboxylic acid esters, their modified products, amides formed by the reaction of poly (lower alkyleneimine) and polyesters having free carboxyl groups, and their salts.

As the aqueous dispersant having an electron donative group, (meth)acrylic acid-styrene copolymer, (meth)acrylic acid-(meth)acrylic ester copolymer, styrene-maleic acid copolymer, polyvinyl alcohol, water-soluble resins (water-soluble high-molecular weight compounds) such as polyvinylpyrrolidone, various types of anionic surfactants, nonionic surfactants, ampholytic surfactants, etc., can be used.

Examples of the anionic surfactants include sodium lauryl sulfate, polyoxyethylene alkyl ether sulfate, sodium dodecylbenzene sulfonate, alkali salt of styrene-acrylic acid copolymer, sodium stearate, sodium alkylnaphthaline sulfonate, sodium alkyldiphenylether disulfonate, monoethanolamine lauryl sulfate, triethanolamine lauryl sulfate, ammonium lauryl sulfate, monoethanolamine stearate, sodium stearate, sodium lauryl sulfate, monoethanolamine of styrene-acrylic acid copolymer, and polyoxyethylene alkyl ether phosphate.

Examples of the nonionic surfactants include polyoxyethylene oleyl ether, polyoxyethylene lauryl ether, polyoxyethylene nonylphenyl ether, polyoxyethylene alkyl ether phosphate, polyoxyethylene sorbitan monostearate, and polyethylene glycol monolaurate. Examples of the ampholytic surfactants include alkyl betains such as betain alkyldimethylaminoacetate, and alkylimidazoline.

It is especially preferable to use a dispersant having amino group as electron donative group, examples of such dispersant including Disperbyk-130, -101, -161, -162, -163, -164, -165, -166 and -170 (produced by BYK-Chemie Japan, Co., Ltd.), EFKA-47, -47EA, -48, -49, -100, -400 and -450 (produced by EFKA Co., Ltd.), and Solsperse 13240, 13940, 17000, 24000GR, 28000, 20000, 12000 and 27000 (produced by Avecia Co., Ltd.).

Dispersant (b) having an electron donative group shows an excellent dispersing effect for the high-resistivity carbon black (a). It functions to reduce the viscosity of the carbon black dispersion and derive the excellent innate characteristics (insulating properties, coloring power and opacifying properties) of the high-resistivity carbon black (a) to the maximal degree. Consequently, it provides a carbon black dispersion for black matrix forming resist, which is capable of producing a thin-film black matrix with high light screening efficiency and low surface reflectance. The polymeric dispersant (b) having an electron donative group is most preferably of a comb-like structure. "Polymer of the comb-like structure" means a polymer of the structure comprising a linear polymer as backbone, with many linear polymers branching off. The polymers of such a structure have good surface adhesiveness to carbon black.

Dispersing medium (c) is now explained. The type of dispersing medium is not specified in the present invention. For example, organic solvents, typically cellosolve acetate and cellosolve acetate type solvents such as cellosolve acetate, propylene glycol monomethyl ether acetate, 3-methoxybutyl acetate, methoxypropyl acetate and 2-methoxy ethyl acetate, and hydrocarbon compounds having ether and ester bonds such as 3-ethoxyethyl propionate and propylene glycol monomethyl ether propionate, and water can be used preferably.

The carbon black dispersion described above contains a high-resistivity carbon black (a), a dispersant having an electron donative group (b) and a dispersing medium (c) such as mentioned above. The dispersant having an electron donative group (b) is selected from those which are soluble in the dispersing medium (c). The percentage of the high-resistivity carbon black (a) in the dispersion is usually 10 to 80% by weight, preferably 20 to 60% by weight, based on the dispersing medium (c). When the percentage of the high-resistivity carbon black (a) is less than 10% by weight, desired coloring and/or opacifying power may not be obtained. On the other hand, when the percentage of the said carbon black (a) exceeds 80% by weight, the dispersion viscosity becomes too high, giving adverse effect on the handling quality of the dispersion. In this case, mechanical strength of the formed black matrix thin film and its adhesiveness to the substrate are also reduced.

The percentage of the dispersant having an electron donative group (b) is usually 0.2 to 20% by weight, preferably 1 to 15% by weight, based on the dispersing medium (c). When the dispersant (b) is used in a smaller percentage than 0.2% by weight, dispersibility of the high-resistivity carbon black (a) may be lowered, while use of the dispersant (b) in excess of 20% by weight results in a reduced developing performance when forming the black matrix.

It is also preferable to blend a polymeric binder in the dispersion for providing smoothness to the formed black matrix thin film. As such a polymeric binder, for instance copolymers of carboxyl group-containing monomers such as acrylic acid or methacrylic acid and other monomers can be used. Examples of the "other" monomers are methyl acrylate, methyl methacrylate, ethyl acrylate, ethyl methacrylate, 2-hydroxyethyl acrylate, 2-hydroxyethyl methacrylate, 2-hydroxypropyl methacrylate, benzyl acrylate, glycidyl methacrylate, styrene, acrylamide, acrylonitrile and the like. As the polymeric binder, phenolic novolak epoxy acrylate polymers, phenolic novolak epoxy methacrylate polymers, cresol novolak epoxy acrylate polymers, cresol novolak epoxy methacrylate polymers, bisphenol A epoxy acrylate polymers, bisphenol S epoxy acrylate polymers and the like can be used. The percentage of the polymeric binder used in the present invention is usually 3 to 50% by weight, preferably 5 to 30% by weight, based on the dispersing medium (c).

The carbon black dispersion is prepared by mixing the necessary components described above by a suitable means. As the mixing means, there can be used, for example, paint shaker, sand mill, ball mill, roll mill and the like. Usually, a dispersion of a homogeneous composition can be obtained by mixing at about 5 to 70° C. for about 1 to 50 hours. In view of dispersion stability and fluidity, the average particle diameter of the carbon black in the dispersion is usually not less than about 0.005 μm, preferably not less than about 0.01 μm, and when considering coloring power, degree of blackness and dispersion stability, the average particle diameter of the said carbon black should be usually not more than 2.5 μm, preferably not more than 1.5 μm.

The carbon black dispersion described above is used for preparing a resist for forming a black matrix. A resist for forming a black matrix can be prepared by blending a photopolymerizable monomer, a prepolymer, a photopolymerization initiator, an amine type sensitizer and other necessary components in the carbon black dispersion of the present invention. As the photopolymerizable monomer, for instance mono- or polyfunctional (meth)acrylate-based monomers can be used. As the prepolymer, polyester acrylate, polyurethane acrylate, epoxy acrylate, polyether acrylate, oligoacrylate, alkyd acrylate, polyol acrylate and the like can be used. As the photopolymerization initiator, carbonyl compounds, sulfur compounds, azo compounds, organic peroxides and the like can be used. As the other components, quaternary amines such as benzyltrimethylammonium chloride and diethylhydroxyamine, organic acids such as lactic acid and oxalic acid and their methyl ethers, t-butylpyrocatechol, organic phosphines, phosphites and copper compounds such as copper naphthenate can be used. These components can be blended when preparing the carbon black dispersion of the present invention.

Viscosity of the resist for forming a black matrix is not specifically defined in the present invention, but in view of handling qualities in forming a black matrix on the TFT side of the liquid crystal panel and uniform controlling of the formed film thickness, the resist viscosity should be usually 10 to 2,000 Pa·s, preferably 20 to 1,000 Pa·s at 25° C.

According to the present invention described above, there is provided a high-resistivity carbon black which is high in light screening performance, low in surface reflectance and also capable of providing a thin-film black matrix, and thus the industrial value of the present invention is outstanding.

EXAMPLES

The present invention will be described in further detail with reference to the examples thereof, which examples are however merely intended to be illustrative and not to be construed as limiting the scope of the invention in any way.

Examples 1–5 and Comparative Examples 1–6

Carbon black was produced according to the conventional oil furnace method except for use of stock oil with low contents of Na, Ca and S and use of water treated with an ion exchange resin for stopping the reaction. 100 g of the produced carbon black was supplied into a cylindrical kiln having an inner diameter of 10 cm and a length of 10 cm, and brought into contact with a mixture of air and ozone (ozone: 6,000 ppm) for a prescribed period of time within the range of 0.5 to 4 hours while rotating the kiln at a speed of 9 rpm. Carbon black used in Examples was prepared by changing the degree of surface oxidation treatment by varying the contact time. Properties of carbon black used in the Examples and Comparative Examples are shown in Table 1.

First, 60 g of each sample of carbon black was dispersed in 1,300 cc of pure water. Since confirmation of the dispersed particle diameter was not easy, the particles were screened out by filtering the water dispersion of forcedly dispersed carbon black. In the Examples, a 20-micron dispersion was prepared by using a homogenizer as dispersing means, and the carbon black particles of 20 microns or smaller were screened out by filtration. In the case of 5-micron dispersion, the carbon black particles of 5 microns or smaller were screened out by filtration using ethanol as dispersant and using a sand mill filled with 1 mm-diameter zirconia beads as dispersing means. The 30-micron dispersion of Comparative Example 4 was prepared by screening out the carbon black particles of 20 to 30 microns by filtration.

Then, 1.3 g of a curing agent was added to a solution of a resin dissolved in toluene (phenolic novolak epoxy resin: 6.7 g; toluene: 60 cc) and dissolved well, then 600 cc of water and 120 cc of ethanol were added and the mixture was stirred by a homogenizer at 900 rpm for 30 minutes to prepare a resin emulsion. 2-ethyl-4-methylimidazole (EMI24 produced by Yuka Shell Epoxy Co., Ltd.) was used as the curing agent. The particle diameter of the obtained resin emulsion was 5 microns. The resin solution was used in the case where no emulsion could be formed.

Then the said resin emulsion or resin solution was added gradually to the screw-stirred carbon black dispersion to coat the carbon black (particle) surfaces with the resin. The dispersion was heated with continued stirring, and after toluene has been evaporated away, the curing treatment (curing in liquid) was conducted at 70° C. for 4 hours. In Comparative Examples 5 and 6, instead of conducting curing in liquid, carbon black adhering to the resin was recovered from the solution, dried in vacuo at 25° C. for 3 hours to remove water and toluene, and then subjected to a curing treatment in a hot-air dryer (curing in gas) at 70° C. for 4 hours.

After hydro-extraction by filtration, the product was put into a vacuum dryer for drying at 62° C. for 10 hours to remove water and solvent to obtain resin-coated carbon black. The solvent residue in the obtained resin-coated carbon black was about 50 ppm and the water residue was about 500 ppm.

Table 2 shows the properties of the resin-coated carbon black samples. The carbon blacks of the Examples contrast sharply with those of the Comparative Examples in respect of volume resistivity. Observation of the resin-coated carbon blacks of the Examples under a high-resolution electron microscope showed peanut choco-ball-like or chestnut burr-like appearance, confirming that the carbon black particle surfaces were densely coated with a resin layer. It is supposed that in the case of the resin-coated carbon blacks of the Examples, jump of electrons is inhibited by the presence of the high-density resin coating layer to realize a remarkable rise of volume resistivity. On the other hand, according to the coating method of the Comparative Examples, the dumpling-like resin masses adhere to the carbon black particle surfaces, and it is supposed that the electrons spark from the non-coated surface area of carbon black to reduce volume resistivity.

Then, using the above-described resin-coated carbon black, a resist composition for forming black matrix was prepared in the following way. First, 20 parts by weight of the above resin-coated carbon black and 6 parts by weight of a dispersant (Solsperse 24000 produced by Avecia Co., Ltd.) of a comb-like structure having amino group as electron donative group were added to 74 parts by weight of a dispersing medium (propylene glycol monomethyl ether acetate) and mixed by stirring at 25° C. by a DYNO-MILL to obtain a carbon black dispersion having a good state of dispersion and a homogeneous composition.

In order to examine the physical properties of the obtained carbon black dispersion, a resist composition for forming black matrix was made in the following way.

25 parts by weight of a prepolymer (epoxy acrylate) was diluted with 10 parts by weight of a photopolymerizable monomer (comprising 3 parts by weight of lauryl acrylate, 3 parts by weight of methyl methacrylate, 3 parts by weight of 2-hydroxyethyl acrylate and 1 part by weight of methacylic acid) and 65 parts by weight of propylene glycol monomethyl ether acetate, and then 2 parts by weight of a photopolymerization initiator (2-methyl-(4-(methylthiophenyl)-2-monopholino-1-propanone) was added to prepare a resin solution for dilution.

40 parts by weight of the said carbon black dispersion, 40 parts by weight of the resin solution for dilution and 20 parts by weight of propylene glycol monomethyl ether acetate were mixed and stirred to obtain a resist for forming black matrix. This resist was applied on a glass plate and a metal plate by a spin coater, dried at 80° C. for 10 minutes and then heat treated at 220° C. for 30 minutes to form an approximately 1 μm thick film on each plate. As the representative physical properties of this film, its optical density (OD) and volume resistivity were determined by the following methods. Results are shown in Table 3.

<OD Value>

The OD value indicates the degree to which a material can absorb light. The more the value of OD, the higher is the density of the coloring material, provided that the length of the light pass is constant. OD of the film formed on the glass plate was determined by a Macbeth® densitometer (TR-927, Orthomatic Type).

<Volume Resistivity>

Volume resistivity in the thickness direction of the film formed on the metal plate was measured by a high resistance meter (Hiresta MCP-HT210 mfd. by Yuka Denshi KK).

TABLE 1

| Physical properties of carbon black | Example | | | | | Comparative Example | | |
|---|---|---|---|---|---|---|---|---|
| | 1 | 2 | 3 | 4 | 5 | 1 | 2 | 3 |
| Specific surface area (m²/g) | 39 | 39 | 39 | 39 | 39 | 39 | 39 | 39 |
| Volatile content (wt %) | 1.33 | 1.33 | 1.33 | 0.55 | 1.33 | 0.31 | 0.55 | 1.33 |
| Volatile content/specific surface area (wt %/m²/g) | 0.034 | 0.034 | 0.034 | 0.014 | 0.034 | 0.008 | 0.014 | 0.034 |

TABLE 2

| Physical properties of resin-coated carbon black (CB) | Example | | | | | Comparative Example | | | | | |
|---|---|---|---|---|---|---|---|---|---|---|---|
| | 1 | 2 | 3 | 4 | 5 | 1 | 2 | 3 | 4 | 5 | 6 |
| Amount of resin coating (wt %) (resin/CB + resin + curing agent) | 9.85 | 9.85 | 9.85 | 9.85 | 10.00 | None | None | 10.00 | 10.00 | 9.85 | 10.90 |
| Amount of curing agent (wt %) (curing agent/resin + curing agent) | 16.3 | 16.3 | 16.3 | 16.3 | None | None | None | None | None | 16.3 | None |
| Resin emulsion particle size (microns) | 5 | 5 | Solution | 5 | 5 | Solution | Solution | Solution | 5 | 20 | 5 |

TABLE 2-continued

| Physical properties of resin-coated carbon black (CB) | Example | | | | | Comparative Example | | | | | |
|---|---|---|---|---|---|---|---|---|---|---|---|
| | 1 | 2 | 3 | 4 | 5 | 1 | 2 | 3 | 4 | 5 | 6 |
| Dispersed CB particle size (microns) | 5 | 20 | 20 | 5 | 117 | 0.3 | 0.5 | 53 | 30 | 20 | 5 |
| Volume resistivity of resin-coated CB ($\Omega \cdot$ cm) | 63400 | 32300 | 10700 | 302 | 63400 | 32300 | 10700 | 302 | 24 | 82 | 24 |
| pH of water slurry of resin-coated CB | 9.2 | 9.0 | 8.6 | 8.8 | 5.2 | 3.8 | 3.2 | 3.6 | 4.8 | 9.2 | 4.8 |

TABLE 3

| Properties of resist film | Example | | | | | Comparative Example | | |
|---|---|---|---|---|---|---|---|---|
| | 1 | 2 | 3 | 4 | 4 | 1 | 2 | 3 |
| OD | 3.4 | 3.4 | 3.4 | 3.1 | 3.1 | 3.1 | 3.0 | 3.1 |
| Volume resistivity ($\Omega \cdot$ cm) | $8.0 \times 10^{14}$ | $6.3 \times 10^{13}$ | $3.8 \times 10^{13}$ | $5.8 \times 10^{12}$ | $4.2 \times 10^{12}$ | $4.0 \times 10^{6}$ | $7.3 \times 10^{6}$ | $5.1 \times 10^{8}$ |

What is claimed is:

1. A high-resistivity carbon black coated with a resin on the surface and having a volume resistivity of not less than 100 $\Omega \cdot$cm.

2. A high-resistivity carbon black according to claim 1, wherein the resin is a polyfunctional epoxy resin.

3. A high-resistivity carbon black according to claim 1, wherein the amount of resin coating is 5 to 40% by weight based on the total amount of carbon black and resin.

4. A high-resistivity carbon black according to claim 1, wherein pH of the resin-coated carbon black as measured in the state of a water slurry is not less than 5.

5. A high-resistivity carbon black according to claim 1 having a volume resistivity of not less than 3,000 $\Omega \cdot$cm.

6. A process for producing the high-resistivity carbon black of claim 1, which comprises adding and mixing a resin-containing solution in a carbon black dispersion to coat the carbon black particle surfaces with the resin, and then curing the resin to obtain resin-coated carbon black having a volume resistivity of not less than 100 $\Omega \cdot$cm.

7. The process according to claim 6, wherein the starting carbon black has already been subjected to an oxidation treatment.

8. The process according to claim 6, wherein the resin-containing solution is added to a carbon black dispersion in which the diameter of the carbon black particles dispersed in the medium is not more than 20 microns.

9. The process according to claim 6, wherein the resin-containing solution is a resin emulsion.

10. The process according to claim 9, wherein the resin emulsion is prepared by emulsifying the resin in the presence of a surfactant.

11. The process according to claim 9, wherein the resin emulsion contains a curing agent.

12. The process according to claim 6, wherein after the carbon black particle surfaces have been coated with a resin by adding and mixing a resin-containing solution in a carbon black dispersion, the resin-coated carbon black is subjected to a heat treatment in the medium to cure the resin.

13. The process according to claim 6, wherein the ratio of the volatile matter of the resin-coated carbon black to the specific surface area is not less than 0.01%·g/m$^2$ by weight.

14. The process according to claim 6, wherein the ash content of the resin-coated carbon black is not more than 1.0% by weight.

15. The process according to claim 6, wherein the resin is a polyfunctional epoxy resin.

16. The process according to claim 6, wherein the amount of resin coating is 5 to 40% by weight based on the total amount of carbon black and resin.

17. The process according to claim 6, wherein volume resistivity of the carbon black is not less than 3,000 $\Omega \cdot$cm.

18. A carbon black dispersion for black matrix forming resist, comprising (a) a high-resistivity carbon black coated with a resin on the surface and having a volume resistivity of not less than 100 $\Omega \cdot$cm, (b) a dispersant having an electron donative group, and (c) a dispersing medium.

19. A carbon black dispersion according to claim 18, wherein the electron donative group of the dispersant is an amino group.

20. A carbon black dispersion according to claim 18, wherein the dispersant is a polymer having a comb-like structure.

21. A carbon black dispersion according to claim 18, wherein the ratio of the high-resistivity carbon black (a) is 10 to 80% by weight based on the dispersing medium (c).

22. A carbon black dispersion according to claim 18, wherein the volume resistivity of the high-resistivity carbon black (a) is not less than 3,000 $\Omega \cdot$cm.

23. A color filter having a black matrix obtained by patterning a resist film having a black coloring material dispersed therein, wherein a high-resistivity carbon black coated with a resin on the surface and having a volume resistivity of not less than 100 $\Omega \cdot$cm is used as the black coloring material.

24. A color filter according to claim 23, wherein the volume resistivity of the high-resistivity carbon black (a) is not less than 3,000 $\Omega \cdot$cm.

* * * * *